United States Patent
Gillespie

(10) Patent No.: US 7,487,943 B1
(45) Date of Patent: Feb. 10, 2009

(54) DUAL ARM MOUNTING SYSTEM WITH VERTICAL ADJUSTMENT FEATURE

(75) Inventor: John Gillespie, Green Oaks, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 218 days.

(21) Appl. No.: 11/649,152

(22) Filed: Jan. 3, 2007

Related U.S. Application Data

(60) Provisional application No. 60/756,305, filed on Jan. 5, 2006.

(51) Int. Cl.
*E04G 3/00* (2006.01)

(52) U.S. Cl. .............. 248/282.1; 248/283.1; 248/917; 248/919; 248/921; 248/922; 248/920; 248/279.1; 248/285.1; 361/681; 361/682

(58) Field of Classification Search ............ 248/274.1, 248/276.1, 282.1, 917, 919, 921, 922, 920, 248/279.1, 285.1, 283.1; 361/681, 682
See application file for complete search history.

(56) References Cited

U.S. PATENT DOCUMENTS

| | | | | |
|---|---|---|---|---|
| 1,796,354 | A * | 3/1931 | Ahlberg .................... 248/282.1 |
| 2,531,925 | A * | 11/1950 | Taylor et al. ................ 108/147 |
| 4,690,362 | A * | 9/1987 | Helgeland ................... 248/404 |
| 5,329,289 | A * | 7/1994 | Sakamoto et al. ........... 345/659 |
| 6,126,128 | A | 10/2000 | Costa et al. |
| 6,343,006 | B1 | 1/2002 | Moscovitch et al. |
| 6,418,010 | B1 | 7/2002 | Sawyer |
| 6,480,172 | B1 | 11/2002 | Sawyer |
| D497,537 | S | 10/2004 | O'Keene et al. |
| 6,905,101 | B1 | 6/2005 | Dittmer |
| 6,994,306 | B1 * | 2/2006 | Sweere et al. ........... 248/295.11 |
| 7,063,295 | B2 * | 6/2006 | Kwon ....................... 248/276.1 |
| D530,595 | S | 10/2006 | Lam et al. |
| 7,152,836 | B2 | 12/2006 | Pfister et al. |
| 7,178,774 | B2 * | 2/2007 | Kim ......................... 248/279.1 |
| 7,293,747 | B2 * | 11/2007 | Wang et al. ............... 248/125.2 |
| 7,392,969 | B2 * | 7/2008 | Chiu et al. ................... 248/676 |
| 7,398,950 | B2 * | 7/2008 | Hung ........................ 248/276.1 |
| 2003/0025054 | A1 * | 2/2003 | Toennesland et al. ..... 248/276.1 |
| 2004/0084579 | A1 | 5/2004 | Lee et al. |
| 2004/0245420 | A1 * | 12/2004 | Pfister et al. ............ 248/289.11 |
| 2006/0186281 | A1 * | 8/2006 | Thiessen ................. 248/123.11 |
| 2006/0186294 | A1 * | 8/2006 | Van Groesen et al. ..... 248/284.1 |
| 2006/0284037 | A1 | 12/2006 | Dittmer et al. |
| 2007/0153459 | A1 * | 7/2007 | Wohlford et al. ............ 361/681 |
| 2008/0078906 | A1 * | 4/2008 | Hung ........................ 248/276.1 |

OTHER PUBLICATIONS

Peerless Product Guide 2003, Audiovisual Mounts and Display Solutions, pp. 6-9.

* cited by examiner

*Primary Examiner*—J. Allen Shriver, II
*Assistant Examiner*—Michael McDuffie
(74) *Attorney, Agent, or Firm*—Foley & Lardner LLP

(57) ABSTRACT

A dual arm articulating mounting system including a vertical adjustment feature. The vertical adjustment feature comprises a bracket that is secured to a rotation box and supports a bolt. The bolt goes through a support plate, with the support plate including at least two holes with bushings inserted therein. The bushings act as guides along smaller-diameter inside tubes while positioning the mount in the vertical position. A nut is threaded onto the bolt on the top side of the plate. As the nut is turned, the rotation box and the television or display device is raised or lowered under its own weight.

20 Claims, 5 Drawing Sheets

DUAL ARM MOUNTING SYSTEM WITH VERTICAL ADJUSTMENT FEATURE

CROSS-REFERENCE TO RELATED APPLICATIONS

The present application claims priority to U.S. Provisional Patent Application No. 60/756,305, filed Jan. 5, 2006 and incorporated herein by reference in its entirety.

FIELD OF THE INVENTION

The present invention relates generally to mounting systems. More particularly, the present invention relates to mounting systems for flat panel televisions with dual articulating arms, where the vertical position of the television can be adjusted after installation.

BACKGROUND OF THE INVENTION

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel televisions units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation and, once the television is secured to the mount, it is often difficult to access and adjust due to it's height. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount the devices without having to make substantial adjustments. Furthermore, with such weights involved and the high cost of such devices, it is extremely important that the device be mounted correctly on the first attempt: if the device is not correctly mounted on the first try, there is a high risk of damaging the device and causing injury to those installing it.

With the above considerations in mind, there have been various attempts to develop mounting systems that address these concerns. Besides the flat wall mounts, there have been articulating arm mounts produced. This type in general allow a flat panel to be placed flat against the wall, or moved straight out away from the wall varying distances (mount dependant) and swing left or right, limited only by TV-to-wall contact. These articulating mounts add tremendous variety to flat panel television viewing including straight, or any variation of up to 90 degrees left or right of straight. Installations can also recess the flat panel television into a cabinet (with an articulating mount) flush with the outer wall surface. The articulating mount then allows the TV to come out of the recess and pivot left or right providing infinite additional viewing angles.

Flat panel televisions are ever increasing in size, and as they become less expensive, consumers are buying the largest they can afford. Flat panel televisions also provide conveniently twice the screen size of a "tube" unit, for a more enjoyable viewing experience. Customers are trying to fit the largest flat panel television into limited space: such as just above a fireplace mantel, enclosed in a cabinet, or in a corner up against the ceiling. These examples require a specific fine tuning of the vertical position of the television for the perfect installation effect, while still maintaining the television swivel left and right feature.

Some newer flat panel television mounts also include an articulating arm which permits the television to be moved away from a wall or other surface. One such single articulating arm mount is designed to primarily hold larger flat panel television units. Such a mount typically includes a welded wall bracket that is connected to the wall using fasteners such as wood screws. The wall bracket is connected to a set of articulating arms via metal tubing. The articulating arm is connected to a set of components that permit the flat panel television, when attached to the mount, to tilt, roll, and rotate relative to a wall or other mounting surface. This style of mount is used not only on a wall, but often is mounted on a recessed opening which is cut out of or built into the wall or mounting surface. In the application of the mount being positioned on a surface that is not recessed, the end user or installer may need to adjust the vertical positioning of the television in order to obtain a preferred viewing location. In the case where the mount is installed within a recessed opening, the installer may need to adjust the vertical position to account for any variance in the original positioning of the mount relative to the opening, or any displacement that may be natural to the mount itself.

SUMMARY OF THE INVENTION

The present invention comprises a dual-arm mounting system, designed to hold larger size flat screen televisions, with a vertical adjustment feature. The mounting system includes a wall bracket that is fastened to the wall using wood screws or other fasteners, connected to two sets of articulating arms. The two sets of articulating arms are connected to a series of components that permit the flat screen television or other display device to tilt, roll, rotate, and vertically adjust feature. An adapter plate is fastened to the mounting plate to which the television or other display device can be attached.

The vertical adjustment feature comprises a bracket that is secured to a rotation box and supports a bolt. The bolt goes through a support plate, with the support plate including at least two holes with bushings inserted therein. The bushings act as guides along smaller-diameter inside tubes while positioning the mount in the vertical position. A nut is threaded onto the bolt on the top side of the plate. As the nut is turned, such as with a wrench, the rotation box, as well as the television or display device, is raised or lowered under its own weight. By being located on the "display side" of the mount, this vertical adjustment feature provides an installer with a very accessible point at which to adjust the vertical position of the flat panel television or other display device.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
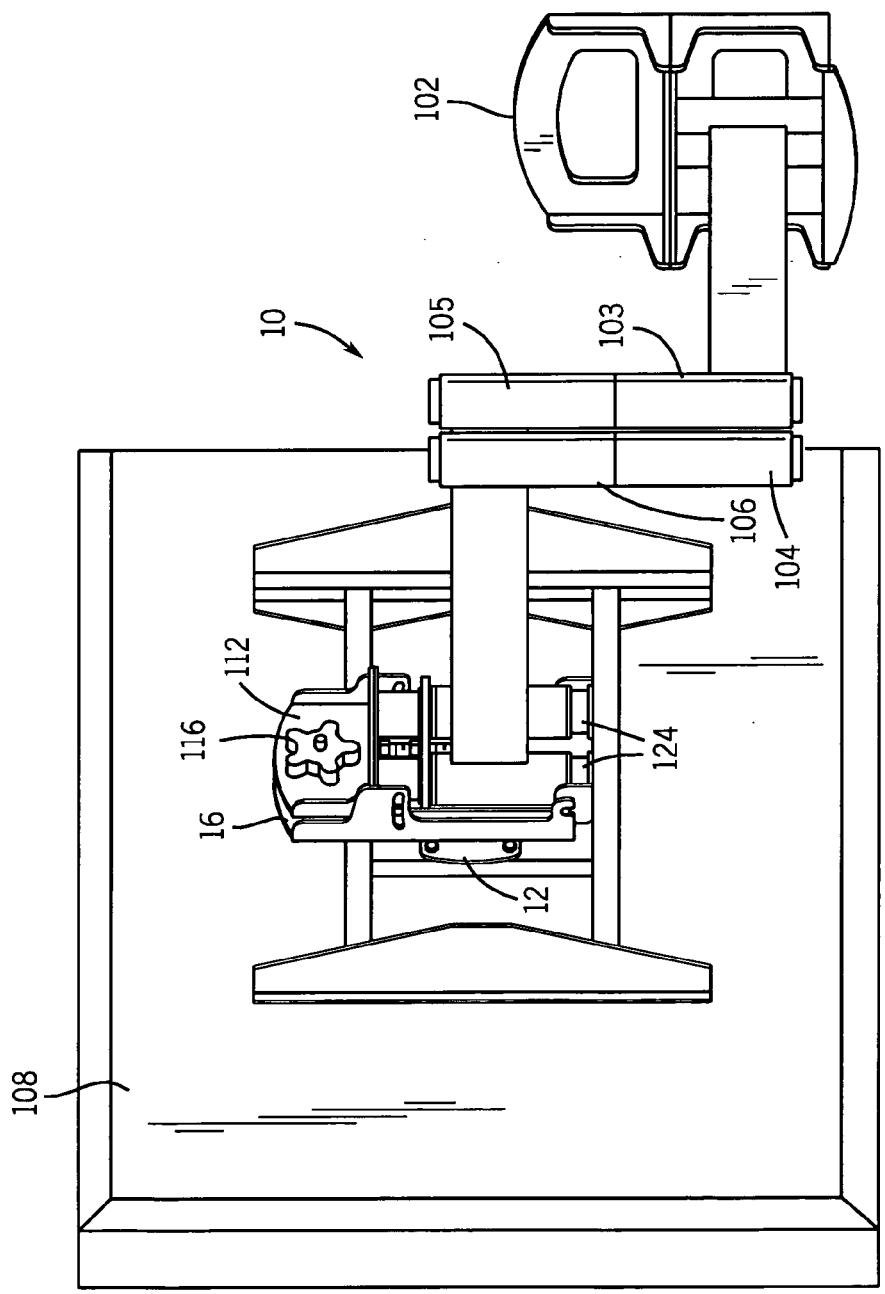
FIG. 1 is a first perspective view of a mounting system constructed in accordance with one embodiment of the present invention.
Figure 2:
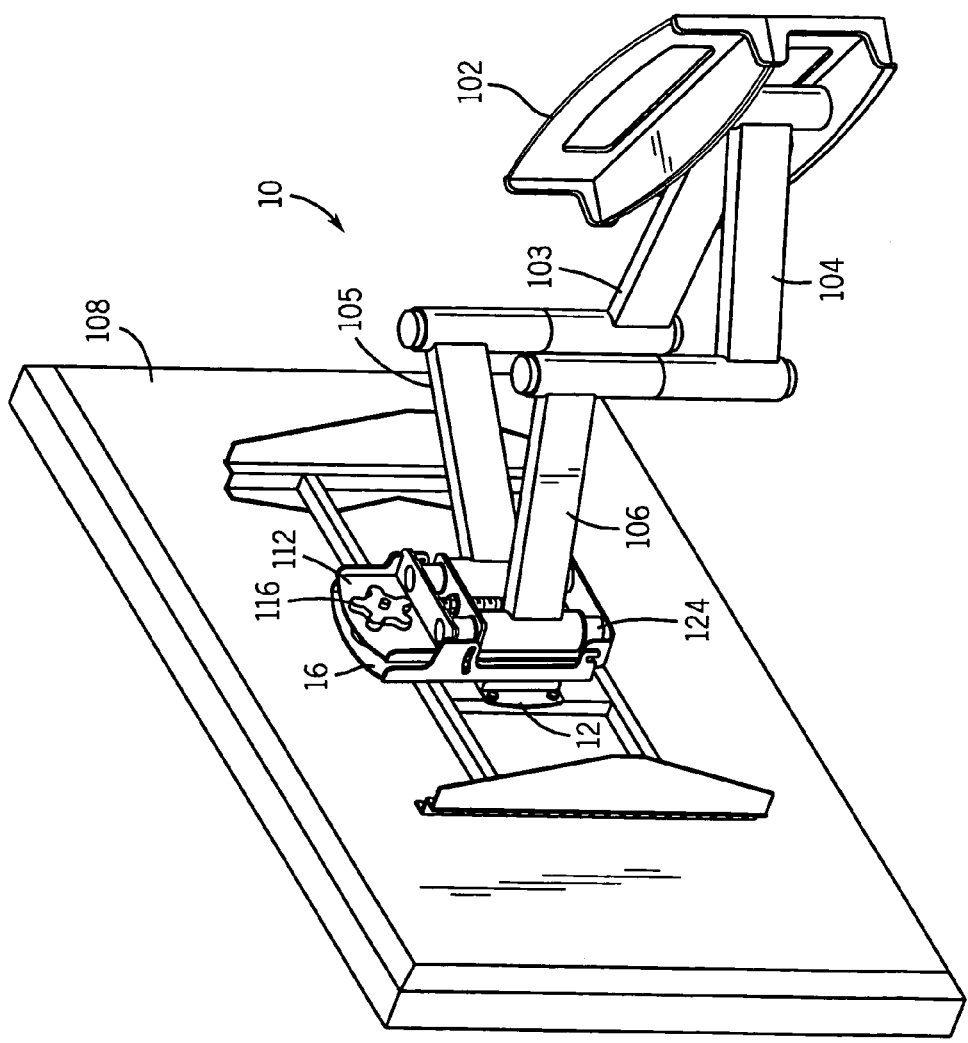
FIG. 2 is a second perspective view of a mounting system constructed in accordance with one embodiment of the present invention.
Figure 3:
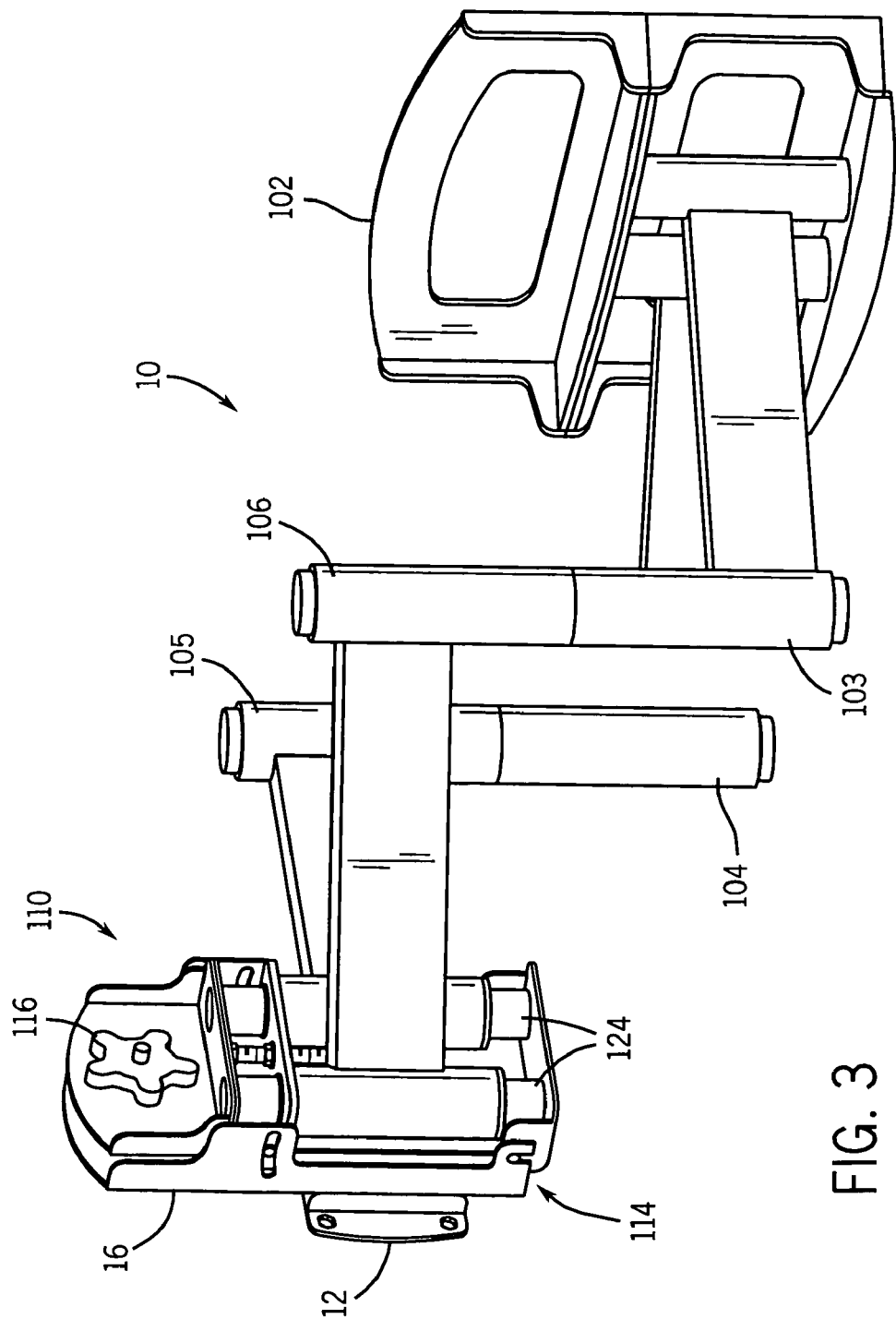
FIG. 3 is a perspective view of a mounting system constructed according to the present invention, without the mounting system being attached to a display device or a support surface.

FIGS. 1 and 2 show a mounting system 100 constructed in accordance with one embodiment of the present invention. The mounting system 100 of FIGS. 1 and 2 includes a wall mounting plate 102 which is adapted to secure to a wall or other flat surface. First and second inner support arms 103 and 104 are rotatably connected to the wall mounting plate 102. When the wall mounting plate 102 is affixed to a wall or other surface substantially perpendicular to the ground, the first and second inner support arms 103 and 104 are capable of rotating about an axis substantially perpendicular to the ground. The first and second inner support arms 103 and 104 are also rotatably connected to a first and second outer support arm 105 and 106, respectively. The pairs of inner and outer support arms 103, 104, 105, 106 are interconnected with a common axle and are attached to the wall mounting plate 102 with short axles. The first and second outer support arms 105 and 106 are operatively connected to the vertical adjustment feature 110 of the present invention, which is operatively connected to a tilt plate 16. The tilt plate 16 is configured to selectively tilt relative to the vertical adjustment feature 110.

The tilt plate 16 is operatively connected to an adapter plate 12, which can directly or indirectly (e.g., via a device mounting plate 111) connect to a display device 108. These components can be connected to each other via screws or other fasteners known in the art. In a preferred embodiment of the invention, the mounting system 100 is configured to support a flat panel television. However, other types of devices could also be mounted on the mounting system 100.

Figure 4:
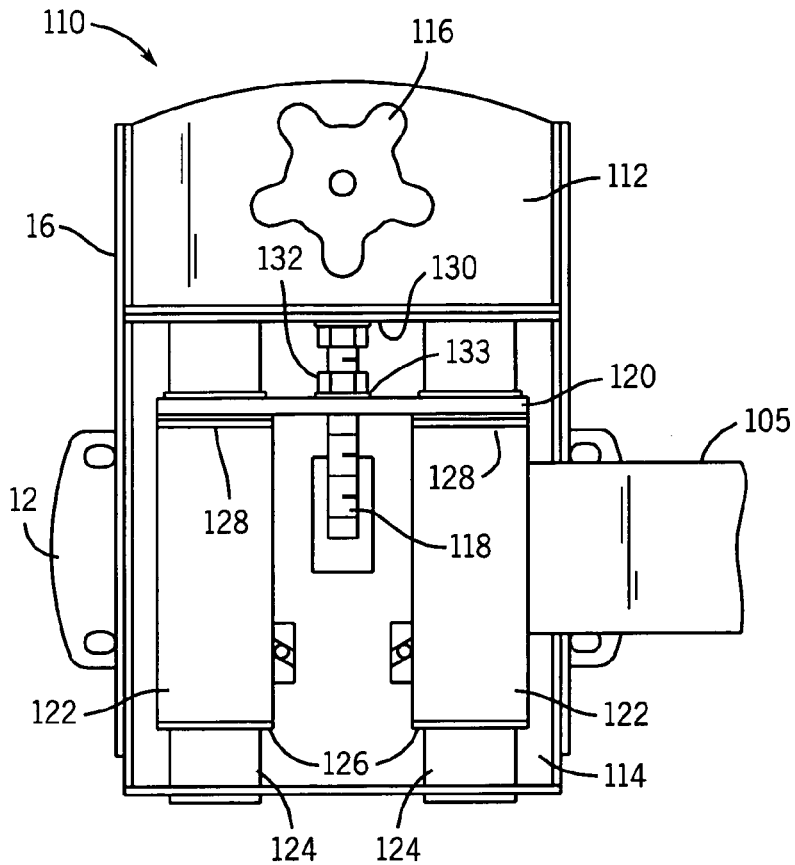
FIG. 4 is a rear view a portion of the vertical adjustment feature of the present invention.
Figure 5:
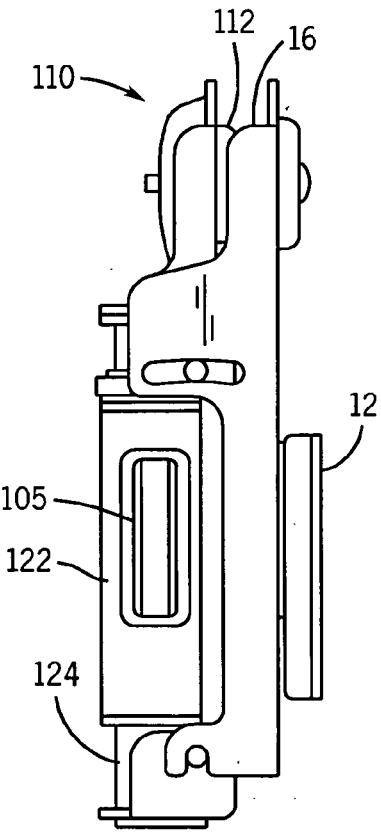
FIG. 5 is a side view of the vertical adjustment feature of FIG. 4.
Figure 6:
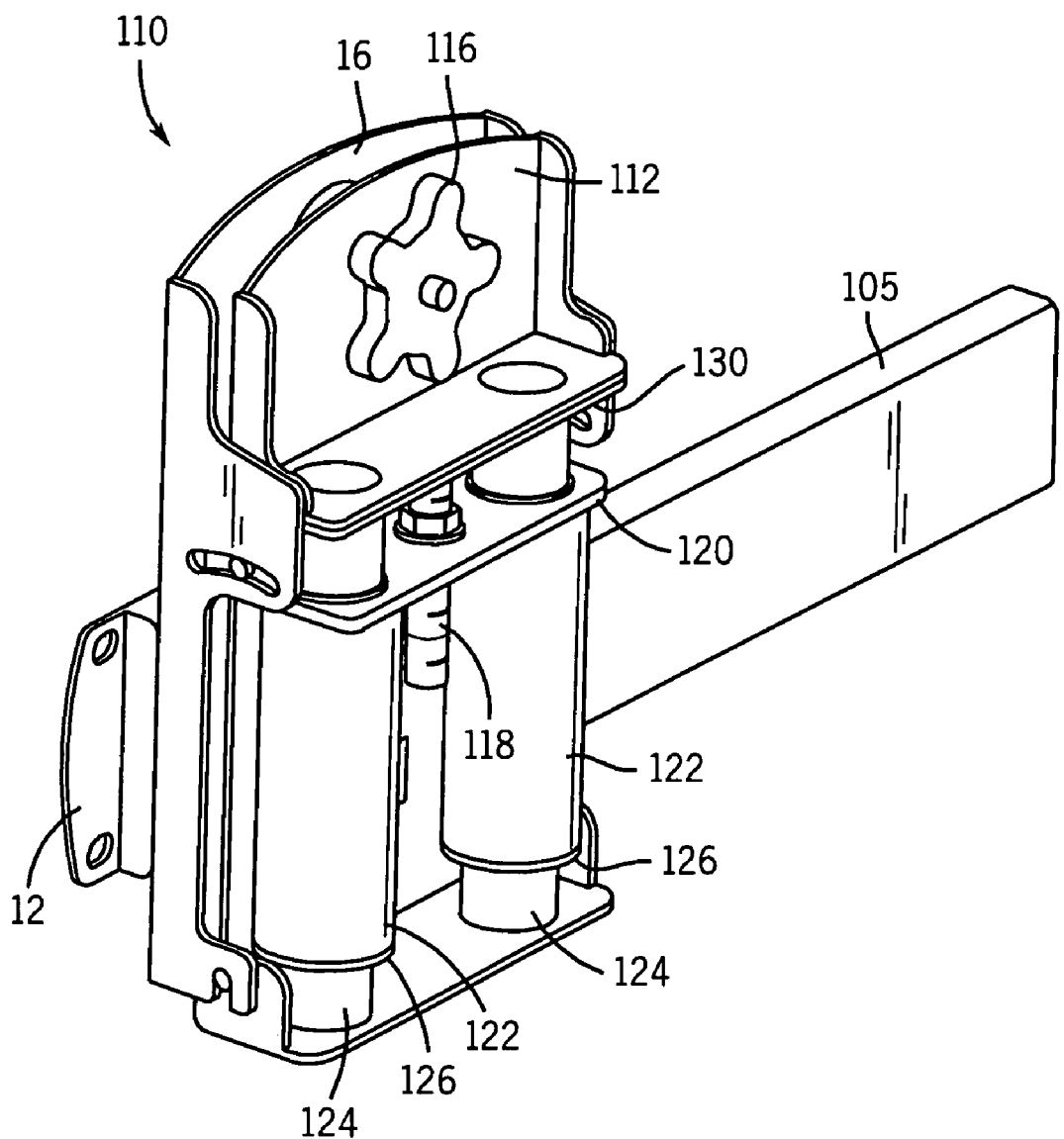
FIG. 6 is a partial perspective view of the vertical adjustment feature of FIG.

FIGS. 4-6 shows the vertical adjustment feature 110, according to one embodiment of the present invention, in greater detail. The vertical adjustment feature 110 includes a tilt stop plate 112 coupled to a tilt box 114. The tilt stop plate 112 can be coupled to the tilt box 114 via welding or other fastening mechanisms. In the embodiment shown in FIGS. 4-6, the tilt stop plate 112 includes an adjustment knob 116 which is used to adjust the angular orientation of the tilt plate 16 relative to the rest of the vertical adjustment feature 110.

In the embodiment shown in FIGS. 4-6, an adjustment bolt 118 is positioned between a support plate 120 and an upper surface of the tilt stop plate 112. The adjustment bolt 118 is held in place by a bolt stop plate 130. An adjustment nut 132 is threadedly connected to the adjustment bolt 118 and is positioned on top of the support plate 120, with a washer 133 therebetween. The support plate 120 is positioned on top of outer support arm end portions 122. A pair of primary axles 124 pass through the outer support arm end portions 122 and the support plate 120 before contacting the upper surface of the tilt stop plate 112. In one embodiment of the invention, the primary axles are welded to the tilt stop plate 112. Support arm bushings 126 are positioned between the lower ends of the outer support arm end portions 122 and the respective primary axles, and support plate bushings 128 are positioned on the opposite end of the outer support arm end portions 122 near the support plate 120. These bushings aid in providing smooth movement of the primary axles 124 within the outer support arm end portions 122.

When attached, the weight of the display device 108 is transferred through the tilt plate 16, the tilt box 114, and the tilt stop plate 112 to the adjustment bolt 118. The support plate 120 serves to spread all of the weight across both of the outer support arm end portions 122. Therefore, the weight of the display device 108 always keeps the various components pushing downward onto the adjustment nut 132 and the support plate 120. The support plate 120 is its own component of flat shape, and also is "floating" in that there are no other direct connecting components or shapes. This allows the display device 108 weight to be evenly distributed upon the first and second outer support arms 105 and 106.

In one embodiment of the present invention, the mounting system 100 is supplied to the customer completely assembled, as is shown in FIG. 2. The installation process involves the wall mounting plate 102 being secured to a wall or flat surface, and a display device 108 being directly or indirectly secured to the adapter plate 12. Once installation is complete, vertical adjustment of the display device 108 may be required. To do so, the installer places an adjustment tool, such as a standard open end wrench, on the adjustment nut 132, and turns the adjustment nut 132 either clockwise or counterclockwise. When the adjustment nut 132 is rotated, there is relative movement between the adjustment bolt 118 and the adjustment nut 132. If the adjustment nut 132 is turned clockwise, the display device 108 is raised due to the adjustment bolt 118 moving upward relative to the adjustment nut 132, as the tilt stop plate 112 and other attached components are moved upward as well. If the adjustment nut 132 is rotated counter-clockwise, the display device 108 is lowered as the adjustment bolt 118 moves downward relative to the adjustment nut 132. In one particular embodiment of the present invention, the total potential vertical adjustment is about two inches. This total adjustment can be limited, for example, by the use of a stop nut (not shown) positioned on the adjustment bolt 118. It is also possible for the vertical adjustment feature 110 to have other maximum ranges of vertical movement. The up and down motion of the vertical adjustment feature 110 is guided by the movement of the primary axles 124 within the outer support arm end portions 122, the support arm bushings 126 and the support plate bushings 128.

The location of the vertical adjustment feature 110 (near the display device 108) in the invention has several advantages. First, while pressure has to be placed onto the support arms, only one adjustment point (at the adjustment nut 132) is required. Second, the inherent shallow depth of the end components is maintained even with the inclusion of the vertical adjustment feature 110. Third, the locating of the vertical adjustment feature 110 near the display device 108 preserves the overall "look" of the wall mounting plate 102, with the wall mounting plate 102 remaining uncluttered and non-mechanical in appearance. The additional components of the vertical adjustment feature 110 are not visible from even a direct side view. In addition, a side-to-side rotation of the mounted display device 108 is still permissible and is not limited by the addition of the vertical adjustment feature 110. Additionally, by providing linear motion close to the display device 108, moment forces applied to the effected bushings in motion from this mechanism on the axles is reduced over other possible locations.

Installation time is also reduced with the vertical adjustment feature 110 components provided assembled on the same end as the display device 108. This allows for easy separation of the wall mounting plate 102 from the first and second inner support arms 103 and 104, if necessary. With the design wall mounting system 100 shown in FIGS. 1-6, the installer first locates and installs the wall mounting plate 102. The wall mounting plate 102 weighs about 5 lbs in one embodiment of the invention and therefore may be easier to handle by itself than if attached to the rest of the mounting system 100.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system, comprising:
   a first articulating arm having a first articulating arm end;
   a second articulating arm having a second articulating arm end;
   first and second axles slidably engaged with the first and second articulating arm ends, the first and second axles coupled to a stop plate;
   an adjustment bolt threadedly engaged with an adjustment nut and acting against the stop plate,
   wherein the adjustment nut acts against a support plate, the support plate being positioned against the first and second articulating arm ends, and wherein rotation of the adjustment nut results in the adjustment bolt moving linearly relative to the adjustment nut, causing the first and second axles to move in a linear direction relative to the first and second articulating arms.

2. The mounting system of claim 1, further comprising a washer positioned between the adjustment nut and the support plate.

3. The mounting system of claim 1, wherein the first and second axles are positioned substantially perpendicular to the first and second articulating arms.

4. The mounting system of claim 1, further comprising at least one support arm bushing positioned between each of the first and second axles and the first and second articulating arm ends.

5. The mounting system of claim 1, wherein the adjustment bolt is positioned between the first and second axles.

6. A mounting system, comprising:
   a surface mounting plate;
   a first articulating arm coupled to the surface mounting plate and having a first articulating arm end substantially opposite the surface mounting plate;
   a second articulating arm coupled to the surface mounting plate and having a second articulating arm end substantially opposite the surface mounting plate;
   first and second axles slidably engaged with the first and second articulating arm ends, the first and second axles coupled to a stop plate;
   an adjustment bolt threadedly engaged with an adjustment nut and acting against the stop plate,
   wherein the adjustment nut acts against a support plate, the support plate being positioned against the first and second articulating arm ends, and wherein rotation of the adjustment nut results in the adjustment bolt moving linearly relative to the adjustment nut, causing the first and second axles to move in a linear direction relative to the first and second articulating arms.

7. The mounting system of claim 6, further comprising a washer positioned between the adjustment nut and the support plate.

8. The mounting system of claim 6, wherein the first and second axles are positioned substantially perpendicular to the first and second articulating arms.

9. The mounting system of claim 6, further comprising at least one support arm bushing positioned between each of the first and second axles and the first and second articulating arm ends.

10. The mounting system of claim 6, wherein the adjustment bolt is positioned between the first and second axles.

11. The mounting system of claim 6, wherein the first and second articulating arms are connected to the surface mounting plate via first and second surface support arms, the first and second articulating arms and the first and second surface support arm both being independently rotatable relative to the surface mounting plate.

12. The mounting system of claim 6, further comprising:
    a tilt box operatively connected to the stop plate; and
    a tilt plate movably engageable with the tilt box, wherein the tilt plate is tiltable relative to the tilt box.

13. The mounting system of claim 12, further comprising an adapter plate operatively connected to the tilt plate, the adapter plate configured to attach to a display device.

14. A display system, comprising:
    a surface mounting plate;
    a first articulating arm rotatably coupled to the surface mounting plate and having a first articulating arm end substantially opposite the surface mounting plate;
    a second articulating arm rotatably coupled to the surface mounting plate and having a second articulating arm end substantially opposite the surface mounting plate;
    first and second axles movably engaged with the first and second articulating arm ends, the first and second axles coupled to a stop plate;
    a tilt box operatively connected to a stop plate;
    a device mounting plate operatively connected to the tilt box;
    a display device removably connected to the device mounting plate; and
    an adjustment bolt threadedly engaged with an adjustment nut and acting against the stop plate,
    wherein the adjustment nut acts against a support plate, the support plate being positioned against the first and second articulating arm ends, and wherein rotation of the adjustment nut results in the adjustment bolt moving linearly relative to the adjustment nut, causing the first and second axles to move in a linear direction relative to the first and second articulating arms.

15. The display system of claim 14, further comprising a washer positioned between the adjustment nut and the support plate.

16. The display system of claim 14, wherein the first and second axles are positioned substantially perpendicular to the first and second articulating arms.

17. The display system of claim 14, further comprising at least one support arm bushing positioned between each of the first and second axles and the first and second articulating arm ends.

18. The display system of claim 14, wherein the adjustment bolt is positioned between the first and second axles.

19. The display system of claim 14, wherein the adapter plate is coupled to a tilt plate, the tilt plate being tiltable relative to the tilt box.

20. The display system of claim 14, wherein the first and second articulating arms are connected to the surface mounting plate via first and second surface support arms, the first and second articulating arms being rotatable relative to the surface first and second surface support arms.

* * * * *